(12) United States Patent
Sand

(10) Patent No.: US 6,790,168 B1
(45) Date of Patent: Sep. 14, 2004

(54) AUTOMATED SYSTEM AND METHOD FOR FORMING TWO STAGE CUP

(75) Inventor: Dale L. Sand, Hubertus, WI (US)

(73) Assignee: Paper Machinery Corporation, Milwaukee, WI (US)

( * ) Notice: Subject to any disclaimer, the term of this patent is extended or adjusted under 35 U.S.C. 154(b) by 0 days.

(21) Appl. No.: 10/445,984

(22) Filed: May 27, 2003

Related U.S. Application Data

(62) Division of application No. 09/832,068, filed on Apr. 10, 2001, now Pat. No. 6,652,435.

(51) Int. Cl.[7] ................................................. B31B 1/60
(52) U.S. Cl. ......................... 493/84; 493/104; 493/108; 493/114
(58) Field of Search .......................... 493/84, 104, 105, 493/106, 107, 108, 109, 112, 113, 114, 374, 379

(56) References Cited

U.S. PATENT DOCUMENTS

| | | | |
|---|---|---|---|
| 3,079,027 A | 2/1963 | Edwards | |
| 3,128,029 A | 4/1964 | Price et al. | |
| 3,973,316 A | * 8/1976 | Maher | .......................... 29/416 |
| 4,231,476 A | 11/1980 | Compton et al. | |
| 4,551,366 A | 11/1985 | Maruhashi et al. | |
| 5,427,269 A | 6/1995 | Willbrandt | |
| 5,433,337 A | 7/1995 | Willbrandt | |
| 5,524,817 A | 6/1996 | Meier et al. | |
| D372,839 S | 8/1996 | Laib | |
| 5,569,143 A | 10/1996 | Konzal | |
| 5,657,897 A | 8/1997 | Schwartzburg | |
| 5,752,653 A | 5/1998 | Razzaghi | |
| 5,769,266 A | 6/1998 | Willbrandt | |
| 5,860,557 A | 1/1999 | Willbrandt | |

* cited by examiner

*Primary Examiner*—Eugene L Kim
(74) *Attorney, Agent, or Firm*—Andrus, Sceales, Starke & Sawall, LLP

(57) ABSTRACT

An automated cup making system is provided for forming a two stage cup having an upper cup disposed upon a lower cup. An upper cup making machine is provided for forming an upper cup having an upper cup sidewall and an upper cup bottom wall disposed generally transversely to the upper cup sidewall and punched out to define a bottom wall annular border extending radially inwardly from the upper cup sidewall, the upper cup sidewall having an outwardly curled top edge. A lower cup making machine is provided for forming a lower cup having a lower cup sidewall and a bottom cup wall disposed generally transversely to the lower cup sidewall, the lower cup sidewall having a curled top edge. A sealing and assembly machine receives the upper cup from the upper cup making machine and the lower cup from the lower cup making machine for aligning the upper cup with the lower cup one above the other, flattening the lower cup curled top edge such that the upper cup bottom wall annular border is in overlapping relationship with the lower cup flattened top edge and for sonic sealing the annular border to the flattened top edge to form a finished two stage cup.

1 Claim, 5 Drawing Sheets

AUTOMATED SYSTEM AND METHOD FOR FORMING TWO STAGE CUP

This application is a division of application Ser. No. 09/832,068, filed Apr. 10, 2001, now U.S. Pat. No. 6,652,435.

FIELD OF THE INVENTION

This invention relates generally to machines for the manufacture of two piece, seamed paperboard cups coated with thermoplastic, and more particularly, pertains to machines for forming a two stage, paperboard cup wherein an upper portion of a lower cup is uniquely joined to a lower portion of a substantially bottomless upper cup to provide enhanced integrity, insulative and other qualities.

This invention is concerned with cup making equipment for producing a two stage cup as shown and described in U.S. Pat. No. 6,652,435, issued Nov. 25, 2003, which is hereby incorporated by reference. In this aforementioned patent there is set forth a two stage cup having a lower section sized to fit a standard vehicle cup holder, and an upper section with a larger volume than the lower section. More specifically, an upper cup and a lower cup are joined in a manner which provides improved insulative qualities and structural integrity. Such a finished cup is extremely versatile and can be used with hot and cold beverages as well as foodstuffs.

The assignee of the instant application, Paper Machinery Corporation of Milwaukee, Wis., U.S.A., is the manufacturer of paperboard cup making machines used to make a variety of cups and containers such as the upper cup and the lower cup discussed above. A typical cup machine for making paperboard cups, for instance, includes a turret having a plurality of mandrels about which the containers are formed. The turret sequentially rotates the mandrels into cooperation with a variety of work-stations where numerous cup forming procedures occur.

In an exemplary procedure, a circular bottom blank is cut out at one work-station and attached to the end of a mandrel by a vacuum applied through the mandrel. During this procedure, the outside edge or lip of the bottom blank is folded downwardly. At a subsequent work station, a sidewall blank is wrapped around the mandrel. The sidewall blank is heated and sealed along a seam which runs generally longitudinally along the side of the cup. Typically, the paperboard is coated with a thermoplastic material, such as polyethylene, so the blanks may be heated and sealed together. The sidewall blank extends transversely to the bottom blank except along the lip which runs approximately parallel with the sidewall blank. In some applications, the sidewall blank includes a flap extending beyond the lip of the bottom blank, and this flap is bent over the lip. At a bottom finishing station, the flap is pressed against the lip from an inside recessed area of the bottom of the cup. By heating the polyethylene and firmly pressing the sidewall, sidewall flap, and bottom flap lip together, a seal is formed and the cup is provided with a sturdy bottom region having a recessed area. There also may be other workstations where various additional cup forming procedures are carried out. For example, one station may be used to provide a curl at the top of the cup to provide a more functional drinking container and a better appearance.

As discussed in the '435 patent, prior art two stage containers used to fit standard vehicle cup holders are molded from thermoplastic and suffer from several draw backs. These include inefficient insulating quality, susceptibility to deformation upon microwaving, less than optimal biodegradability and a restricted ability to accept printing.

It would be desirable to produce a two stage cup which can be securely accommodated in a standard vehicle cup holder and overcomes the prior art deficiencies by modifying existing cup making equipment and adding a sealing and assembly machine which enables mass production at a reasonable cost.

SUMMARY OF THE INVENTION

It is a general object of the present invention to provide an automated system for forming a two stage cup preferably formed of paperboard having a lower section sized to fit a standard vehicle cup holder, and an upper section with a larger volume than the lower section.

It is one object of the present invention to provide an automated system for forming a two stage cup which makes use of existing cup making equipment.

It is also an object of the present invention to provide an automated system for forming a two stage cup which employs a sonic sealing assembly machine.

It is a further object of the present invention to provide an automated system for forming a two stage cup comprised of a bottomed lower cup and a substantially bottomless upper cup.

It is an additional object of the present invention to provide an automated system for efficiently forming a two stage cup at high volume speeds with minimal down time.

It is another object of the present invention to provide a method of utilizing cup making equipment to form a two stage cup.

In one aspect of the invention, an automated cup making machine is provided for forming a two stage cup having an upper cup disposed upon a lower cup. An upper cup making machine is provided for forming an upper cup having an upper cup sidewall and an upper cup bottom wall disposed generally transversely to the upper cup sidewall and punched out to define a bottom wall annular border extending radially inwardly from the upper cup sidewall, the upper cup sidewall having an outwardly curled top edge. A lower cup making machine is provided for forming a lower cup having a lower cup sidewall and a bottom wall disposed generally transversely to the lower cup sidewall, the lower cup sidewall having a curled top edge. A sealing and assembly machine is provided for receiving the upper cup from the upper cup making machine, and the lower cup from the lower cup making machine, for aligning the upper cup with the lower cup, one above the other, and flattening the lower cup curled top edge such that the upper cup bottom wall annular border lies in overlapping relationship with the lower cup flattened top edge and for sonic sealing the annular border to the flattened top edge to form a finished two stage cup.

The upper cup making machine has a bottom maker which removes a central portion of the upper cup bottom wall. The sealing and assembly machine includes a framework, a turret rotatably mounted to the framework, a lower cup feeding station mounted on the framework and an upper cup feeding station mounted on the framework. The sealing and assembly machine further includes a seam orientation station, a rim pre-flattening station for pre-flattening the lower cup curled top edge and a sonic sealing station for sealing the upper cup and the lower cup together. A blow off station is provided for removing the finished two stage cup. The turret rotates the upper cup and the lower cup sequentially to the seam orientation station, the rim pre-flattening station, the sonic sealing station, and the cup blow off station. The sonic sealing station includes a fixture for sealing the upper cup together with the lower cup. The fixture is comprised of a lower anvil for supporting the upper cup in inverted fashion, an upper anvil for supporting the lower cup in inverted fashion on top of the upper cup (that is, the rim of the lower cup is under the upper cup) and a sonic horn engagable with the overlapping upper cup bottom wall annular border and the lower cup flattened top edge. The sonic horn is disposed between a flap of the upper cup and the upper portion of the lower cup sidewall to effect sealing between the upper cup and the lower cup.

In another aspect of the invention, there is set forth a-method of manufacturing a two stage cup including the steps of a) providing an upper cup making machine for forming an upper cup having an upper cup sidewall with a side seam and an upper cup bottom wall punched out to define a bottom wall annular border extending radially inwardly from the upper cup sidewall;

b) providing a lower cup making machine for forming a lower cup having a lower cup sidewall with a side seam and a lower cup bottom wall extending generally transversely to the lower cup sidewall, the lower cup having a top edge; and c) providing a scaling and assembling machine for aligning and joining the upper cup and the lower cup such that the bottom wall annular border is in overlapping relationship with the lower cup top edge. The step c) includes the step of placing the lower cup upon the upper cup such that the respective side scams are aligned. Step c) further includes the step of pre-flattening the lower cup top edge. Step c) also includes the step of providing a sonic sealing fixture for joining the upper cup bottom wall annular border with the lower cup flattened top edge. The step c) also includes the step of providing a rotatable turret for sequentially moving an aligned upper cup and a lower cup in a circular path past a number of processing stations.

The invention also contemplates cup making equipment for making a first cup having one volume and a second cup of a volume lesser than the first cup, both the first cup and the second cup having a sidewall with a top edge and a bottom wall extending generally transversely to the sidewall. The invention is improved wherein the cup making equipment is constructed and arranged to remove a portion of the bottom wall of the first cup to define a bottom wall annular border extending radially inwardly from the sidewall of the first cup. The cup making equipment is also constructed and arranged to flatten the top edge of the second cup, align the first cup with the second cup such that the flattened top edge of the second cup is in overlapping relationship with the bottom wall annular border of the first cup, and seal the flattened top edge of the bottom wall annular border to join the first cup and the second cup into a two stage cup having an insulated air gap between a lower portion of the first cup and an upper portion of the second cup.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 5 is an exploded, diagrammatic, perspective view of the assembly of the upper cup and the lower cup;

DETAILED DESCRIPTION OF THE INVENTION

Figure 1:
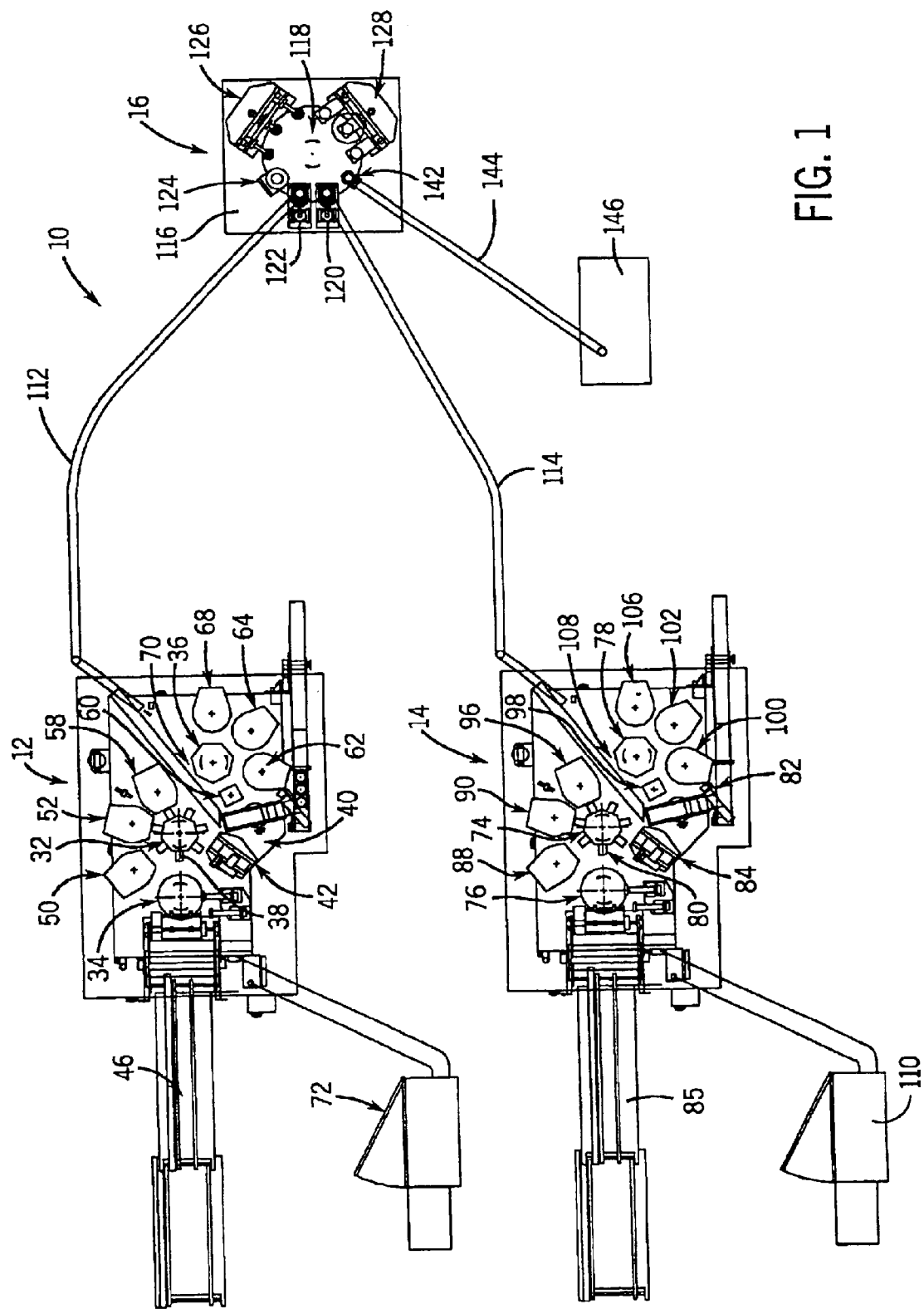
FIG. 1 is a plan view of an automated, cup making system for forming the two stage cup in accordance with the invention.
Figure 2:
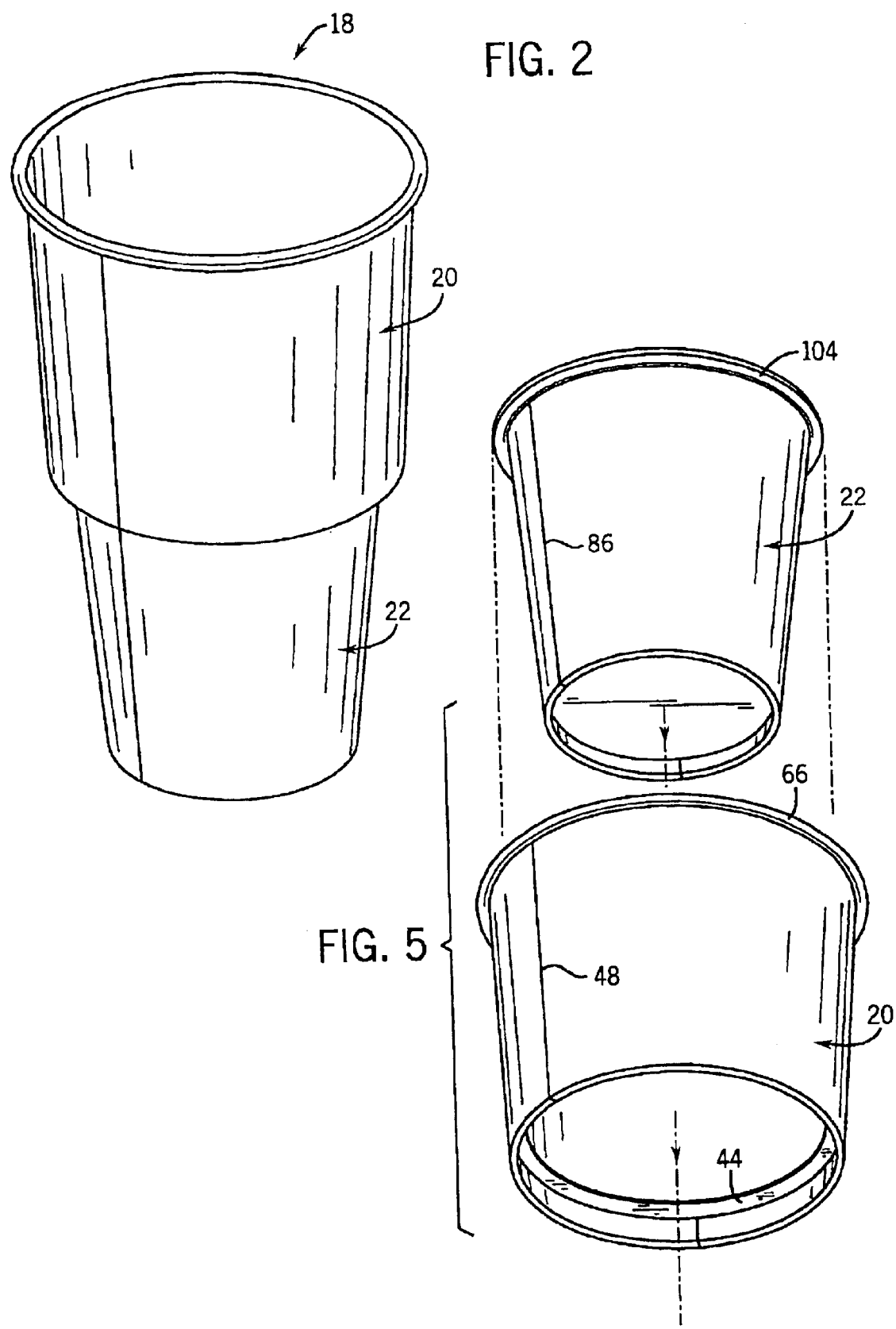
FIG. 2 is a perspective view of the two stage cup made by the automated system of FIG. 1.

Referring now to the drawings, FIG. 1 illustrates an automated cup making system 10 comprised of an upper cup making machine 12, a lower cup making machine 14 and a sealing assembly machine 16. Automated system 10 is used to produce a two sage, paperboard cup 18 as shown in FIGS. 2 through 6 and described in aforementioned U.S. Pat. No. 6,652,435.

Figure 3:
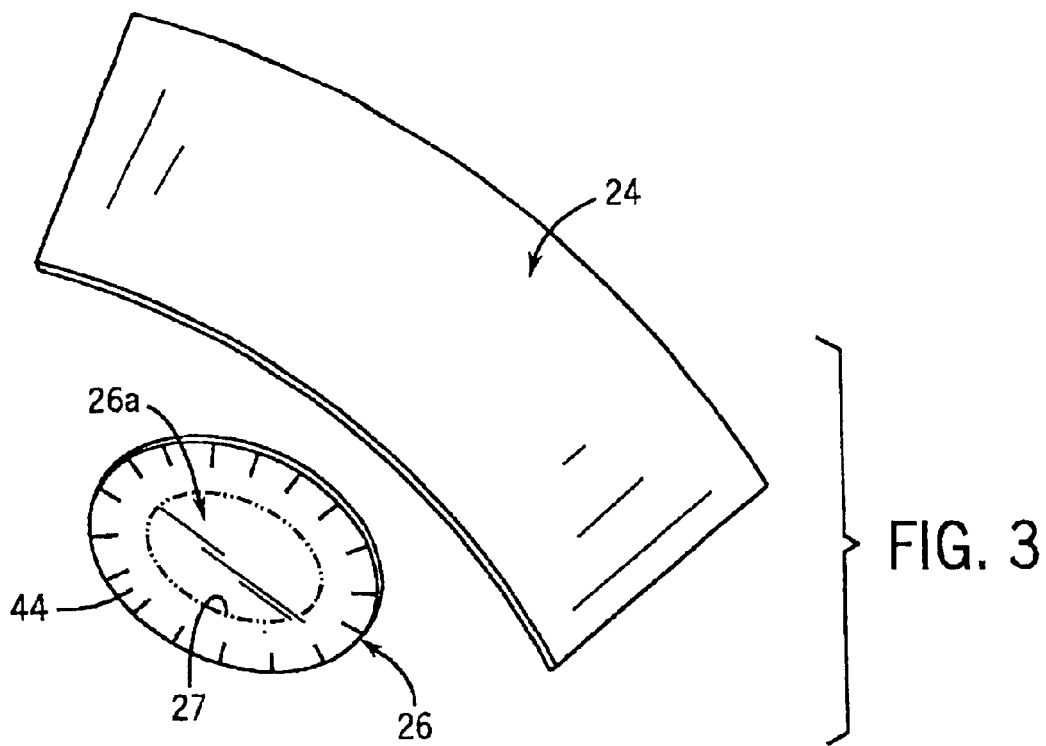
FIG. 3 is an exploded view of the sidewall blank and bottom wall blank of the upper cup used in the container of FIG. 2.
Figure 4:
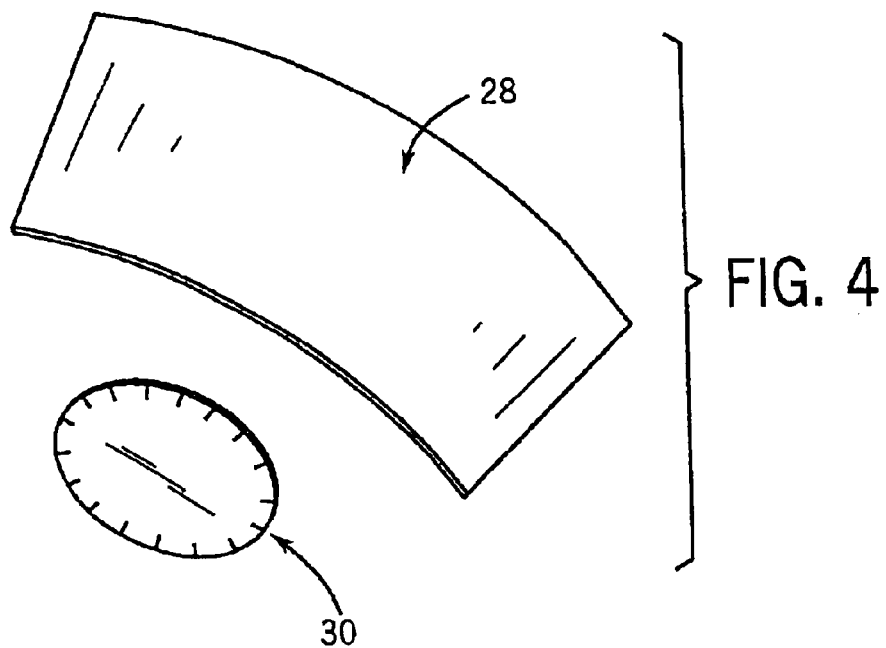
FIG. 4 is an exploded view of the sidewall blank and the bottom blank of the lower cup used in the container of FIG. 2.

Two stage cup 18 is comprised of an upper cup 20 joined to a lower cup 22. Upper cup 20 includes a sidewall blank 24 that forms the sidewall and a bottom wall blank 26, as best seen in FIG. 3. As will be further appreciated, a central portion 26a of bottom blank 26 is punched out along dotted line 27 to form a substantially bottomless bottom wall. In contrast, lower cup 22 includes a sidewall blank 28 that forms a sidewall and a solid bottom blank 30 that forms its bottom wall, as best illustrated in FIG. 4. Sidewall blanks 24 and 28 are typically pre-printed with desired logos, indicia, or the like. The upper cup and lower cup blanks are typically preprinted and coated with a thermoplastic material which permits heating and sealing of adjacent components, as is well known.

Figure 6:
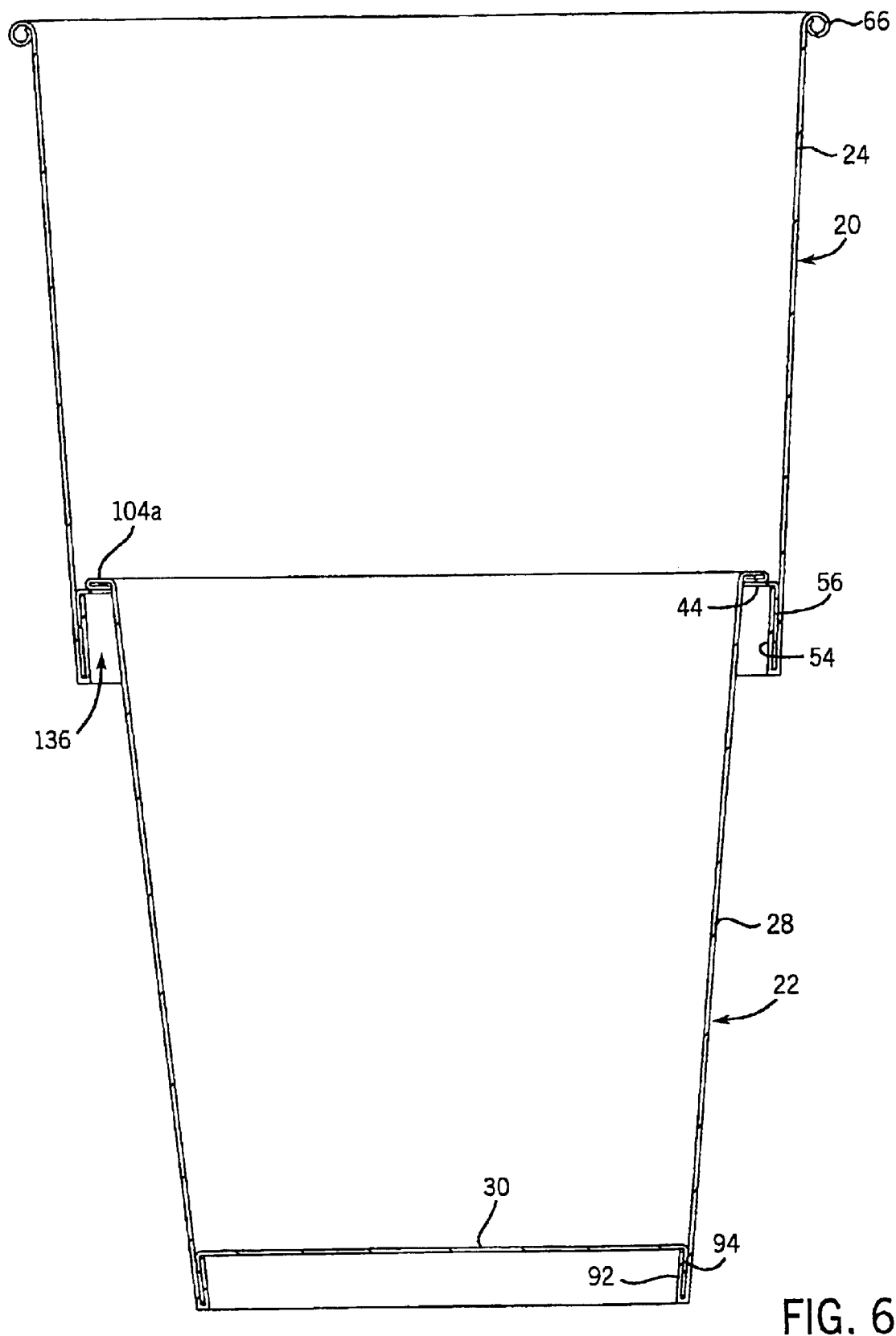
FIG. 6 is a cross-sectional view of the finished cup shown in FIG. 2.

Referring back to FIG. 1, an exemplary upper cup making machine 12 is illustrated. Such machine is of the type manufactured by Paper Machinery Corporation under Model PMC-1250. This particular design includes a mandrel turret 32 which cooperates with a transfer turret 34 and a rimming turret 36. Mandrel turret 32 includes a plurality of mandrels 38 that are rotated in a step wise or indexing manner between surrounding workstations. For example, a bottom blank 26 may be applied to a given mandrel 38 at a bottom maker station 40 and then rotated to a bottom reformer station 42. It is the bottom maker station 40 which is modified to punch out the central portion 26a of the bottom blank 26 thereby forming a radially inwardly extending bottom wall annular border 44, as seen in FIGS. 3, 5 and 6. From this point, the mandrel 38 is rotated into cooperation with the transfer turret 34 which receives sidewall blank 24 from a hopper 46 and rotates the sidewall blank 24 into cooperation with the cooperating mandrel 38. The sidewall blank 24 is folded about the mandrel over the bottom blank 26, heated and sealed along a seam 48 (FIG. 5). Next, the punched out bottom blank 26 and sidewall blank 24 are rotated to a bottom heat station 50. After heating, mandrel turret 32 indexes the subject mandrel 38 to a roller incurl station 52 where a portion of sidewall blank 24, i.e., a sidewall blank flap 54, is bent over an outer lip 56 of the punched out bottom blank 26 to form a recessed bottom in the upper cup 20 as seen in FIG. 6. The upper cup 20 is then moved to a bottom finish station 58 where the sidewall blank flap 54 and the punched out bottom blank lip 56 are pressed against the lower region of the sidewall blank 24 to form a seal. Once the bottom region is formed and sealed, the upper cup 20 is transferred to rimming turret 36 and rotated to a lube station 60 and then to a rimming pre-curl station 62 where the upper edge of the sidewall 24 is curled outwardly. From that station, the upper cup 20 is indexed to a rimming finish curl station 64 which finishes the curled portion along the top of the cup to make an attractive edge 66. At this point, the upper cup 20 may be moved to an optional lid groover station 68 and then to a cup blow off station 70 for removal of the finished upper cup 20. An automated control station 72 is provided to coordinate the workstation processes.

An exemplary lower cup making machine 14, such as a Paper Machinery Corporation Model PMC-1000 or 1250, also includes a mandrel turret 74 which cooperates with a transfer turret 76 and a rimming turret 78. Mandrel turret 74 includes a plurality of mandrels 80 that are rotated in an indexing fashion around surrounding workstations. In contrast to upper cup 12, bottom blank 30 of lower cup 22 is solid and is applied to a given mandrel 80 at a bottom maker station 82 and then rotated to a bottom reformer station 84. From this point, the mandrel 80 is rotated into cooperation with the transfer turret 76 which receives sidewall blanks 28 from a hopper 85 and rotates the sidewall blank 28 into cooperation with the cooperating mandrel 80. Sidewall blank 28 is then folded about the mandrel 80 over bottom blank 30, heated and sealed along a seam 86 as seen in FIG. 5.

Next, the bottom blank 30 and sidewall blank 28 are rotated to a bottom heat station 88. After heating, the mandrel turret 74 indexes the subject mandrel to a roller incurl station 90 where a portion of sidewall blank 28, i.e. sidewall blank flap 92, is bent over an outer lip 94 of a solid bottom blank 30 to form a recessed bottom in the lower cup 22 as seen in FIG. 6. The lower cup 22 is then moved to a bottom finish station 96 where the sidewall blank flap 92 and the bottom blank lip 94 is pressed against the lower region of sidewall blank 28 to form a seal.

Once the bottom is formed and sealed, the lower cup 22 is transferred to rimming turret 78 and transferred to a lube station 98 and then to a rimming precurl station 100 where the upper edge of sidewall 28 is curled outwardly. From that station, the lower cup 22 is indexed to a rimming finish station 102 which finishes the curl portion of top edge of the lower cup to make an attractive edge 104 (FIG. 5). At this point, the lower cup 22 may be moved to an optional lid groover station 106 and then to a cup blow off station 108 for removal of the finished lower cup 22. An automated control station 110 is provided to coordinate the workstation processes.

Once the substantially bottomless upper cup 20 and the solid bottom lower cup 22 are formed, they are transferred to the sealing and assembly machine 16 via respective conduits 112, 114. Sealing and assembly machine 16 includes a framework 116 with a timed turret 118 rotatably mounted thereon which rotates the upper cup 20 and the lower cup 22 along a circular path to a series of processing stations. Lower cup 22 is brought to a lower cup servo feeder 120 while upper cup 20 is carried to an upper cup servo feeder 122. The cups 20, 22 are manipulated (as shown diagrammatically in FIG. 4) at a seam orientation station 124, one on top of the other, that is, the lower cup 22 over the upper cup 20, so that their respective seams 86, 48 and printing are aligned. In the alignment process, the top edge 104 of lower cup 22 is placed in overlapping relationship with the annular border 44 of the upper cup 20 (FIG. 6). Then, a group of three aligned cups 20, 22 is transferred by turret 118 to a rim pre-flattening station 126 where the curled upper edge 104 of a lower cup 22 is pre-flattened to create a flattened top edge 104a (FIG. 6). Next, this group of aligned cups 20, 22 is rotated to a conventional sonic sealing station 128 where the top edge 104a of the lower cup 22 is sonic sealed to annular border 44 of an upper cup 20. Sonic sealing station 128 is typically a Model 900 series such as manufactured by Branson Ultrasonics of Arlington, Ill.

Figure 7:
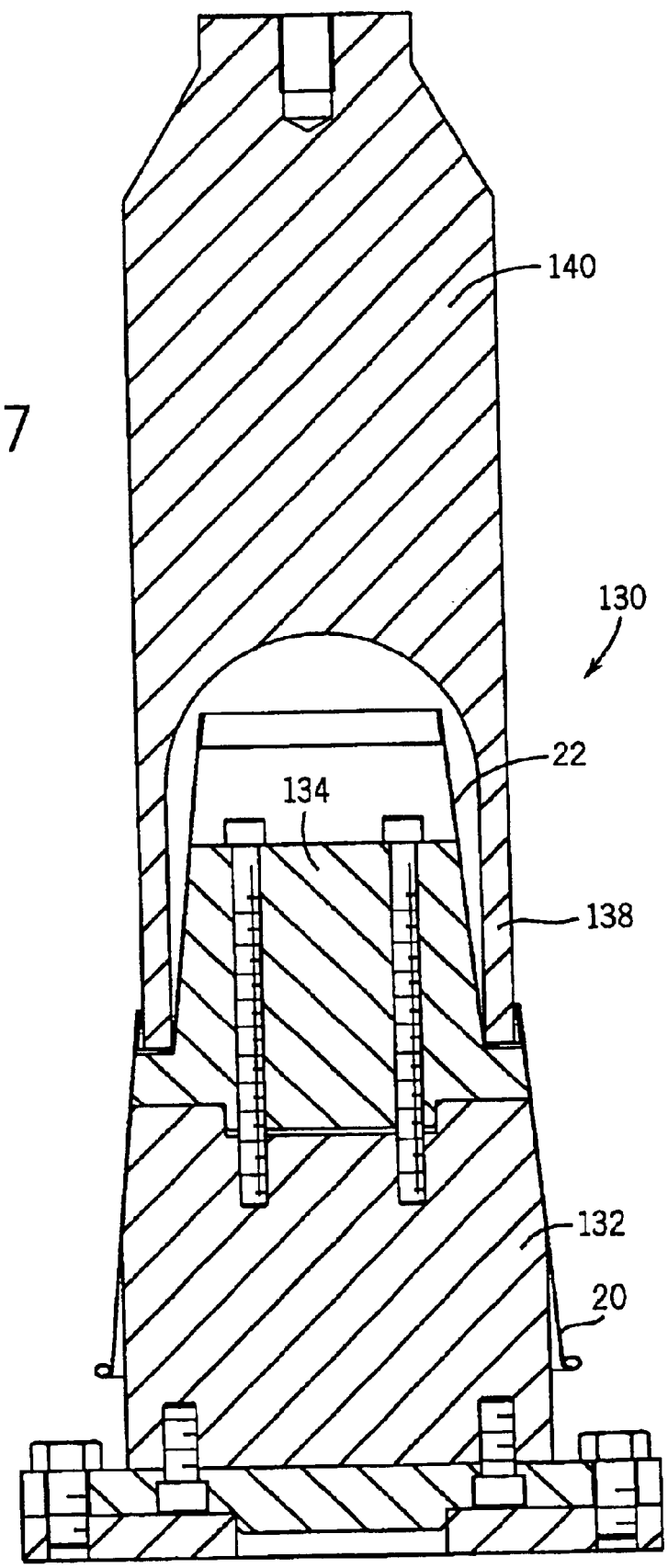
FIG. 7 is a cross-sectional view of a fixture used in the automated system of FIG. 1 to sonic seal the upper cup and the lower cup together.

Used in sonic sealing station 128 is a fixture 130 (FIG. 7) including a first anvil 132 upon which the upper cup 20 is invertedly supported, and a second anvil 134 joined to the first anvil 132 for invertedly supporting the lower cup 22. In their inverted positioning, a pocket 136 is created between the upper portion of the lower cup sidewall 28 and the lower portion of the upper cup flap 54 as best seen in FIG. 6. A sidewall 138 of a sonic horn 140 is moved into pocket 136 to further flatten top edge 104a, seal the flattened top edge 104a to annular border 44 and join the upper cup 20 and lower cup 22 together in a leak proof seal. As a result, two stage cup 18 is finished with an air gap which insulates and protects the holder of a cup 18 with hot contents. The structural integrity of the cup 18 is enhanced by the sealed and flattened edge 104a of the lower cup 22 as it is fused to the upper cup 20. The finished two stage cups 18 are then rotated to a cup blow off station 142 where the cups 18 are transferred through a conduit 144 to a depository, such as a cup stacker 146.

It should now be appreciated that the present invention provides a three-piece automated system and method for forming a two stage paperboard cup. The system takes advantage of existing cup making equipment and provides a unique sealing and assembly machine which enables high speed production in the ranges of 140 cups per minute with reliability and minimal down time.

Various alternatives and embodiments are contemplated as being within the scope of the following claims particularly pointing out and distinctly claiming the subject matter regarded as the invention.

I claim:

1. In cup making equipment for making a first cup having one volume and a second cup of a volume lesser than the first cup, both the first cup and the second cup having a sidewall with a top edge and a bottom wall extending generally transversely to the sidewall, the improvement wherein:

the cup making equipment is constructed and arranged to remove only a central portion of the bottom wall in the first cup to define a bottom wall annular border extending radially inwardly from the sidewall of the first cup; and the cup making equipment is constructed and arranged to flatten the top edge of the second cup, align the first cup above the second cup such that the flattened top edge of the second cup is in horizontal overlapping relationship with the bottom wall annular border of the first cup, and seal the pre-flattened top edge to the bottom wall annular border to join the first cup and the second cup into a single two stage cup having an insulated air gap between a lower portion of the first cup and an upper portion of the second cup.

* * * * *